(12) United States Patent
Engel et al.

(10) Patent No.: US 11,610,112 B2
(45) Date of Patent: Mar. 21, 2023

(54) METHOD FOR THE COMPUTER-AIDED CONFIGURATION OF A DATA-DRIVEN MODEL ON THE BASIS OF TRAINING DATA

(71) Applicant: Siemens Aktiengesellschaft, Munich (DE)

(72) Inventors: Thomas Engel, Aalen (DE); Alexander Michael Gigler, Untermeitingen (DE)

(73) Assignee: SIEMENS AKTIENGESELLSCHAFT

( * ) Notice: Subject to any disclaimer, the term of this patent is extended or adjusted under 35 U.S.C. 154(b) by 590 days.

(21) Appl. No.: 16/627,562

(22) PCT Filed: Jun. 7, 2018

(86) PCT No.: PCT/EP2018/065029
§ 371 (c)(1),
(2) Date: Dec. 30, 2019

(87) PCT Pub. No.: WO2019/007626
PCT Pub. Date: Jan. 10, 2019

(65) Prior Publication Data
US 2020/0218972 A1    Jul. 9, 2020

(30) Foreign Application Priority Data
Jul. 5, 2017    (EP) .................... 17179817

(51) Int. Cl.
*G06N 3/08*    (2006.01)
*G06N 3/04*    (2006.01)

(52) U.S. Cl.
CPC .............. *G06N 3/08* (2013.01); *G06N 3/04* (2013.01)

(58) Field of Classification Search
CPC .................................. G06N 3/04; G06N 3/08
(Continued)

(56) References Cited

U.S. PATENT DOCUMENTS

| 7,084,973 B1 | 8/2006 | Ingram |
| 9,449,283 B1 * | 9/2016 | Purpura ................. G06N 20/00 |

(Continued)

OTHER PUBLICATIONS

Tianwei Yu et al: "Improving peak detection in high-resolution LC/MS metabolomics data using preexisting knowledge and machine learning approach", Bioinformatics., vol. 30, No. 20, pp. 2941-2948, XP055443736, GB, ISSN: 1367-4803, DOI: 10.1093/bioinformatics/btu430, summary, sections 1 and 2; 2014.

(Continued)

*Primary Examiner* — James E Springer
(74) *Attorney, Agent, or Firm* — Schmeiser, Olsen & Watts LLP

(57) ABSTRACT

A method for the computer-assisted configuration of a data-driven model on the basis of training data is provided. The method is characterised in that the series of measurements are subjected to a suitable preprocessing process comprising a binning step, wherein measurement characteristics which existed during the measurement of the measurement values in question are taken into consideration. A suitable data-driven model such as a neural network is then learned on the basis of the pre-processed series of measurements. This learned data-driven model makes it possible to accurately forecast target vectors in accordance with associated series of measurements. The method can, for example, be used to analyse optical spectra. More particularly, it is possible to predict using the learned model whether the tissue sample for which an optical spectrum was detected represents diseased tissue.

15 Claims, 2 Drawing Sheets

Figure 1:
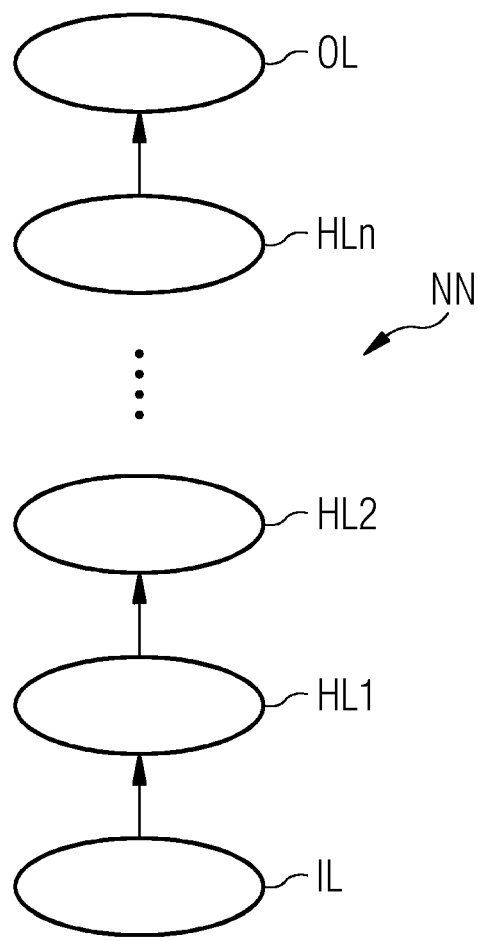

(58) Field of Classification Search
USPC .......................................................... 706/18
See application file for complete search history.

(56) References Cited

U.S. PATENT DOCUMENTS

2015/0379430 A1* 12/2015 Dirac .................... G06N 20/00
706/12
2020/0372296 A1* 11/2020 Maher .................... G16H 50/20

OTHER PUBLICATIONS

PCT International Search Report dated Sep. 7, 2018 and corresponding to PCT International Application No. PCT/EP2018/065029 filed on Jun. 7, 2018.
Non-English European Exam Report for Application No. 17179817.6, dated Oct. 8, 2019.
Non-English European Search Report for Application No. 17179817.6, dated Jan. 31, 2018.
Sankaranarayanan Mahadevan: "Data-Based Fault Detection and Diagnosis in Biological and Process Systems", Doctoral thesis, XP055443744, University of Alberta, Edmonton, Alberta, gefunden im Internet: URL:http://www.collectionscanada.gc.ca/obj/thesescanada/vol2/002/NR55824.PDF, gefunden am Jan. 23, 2018, sections 1.2.2, 1.2.3, 3.3.3, 3.4.

* cited by examiner

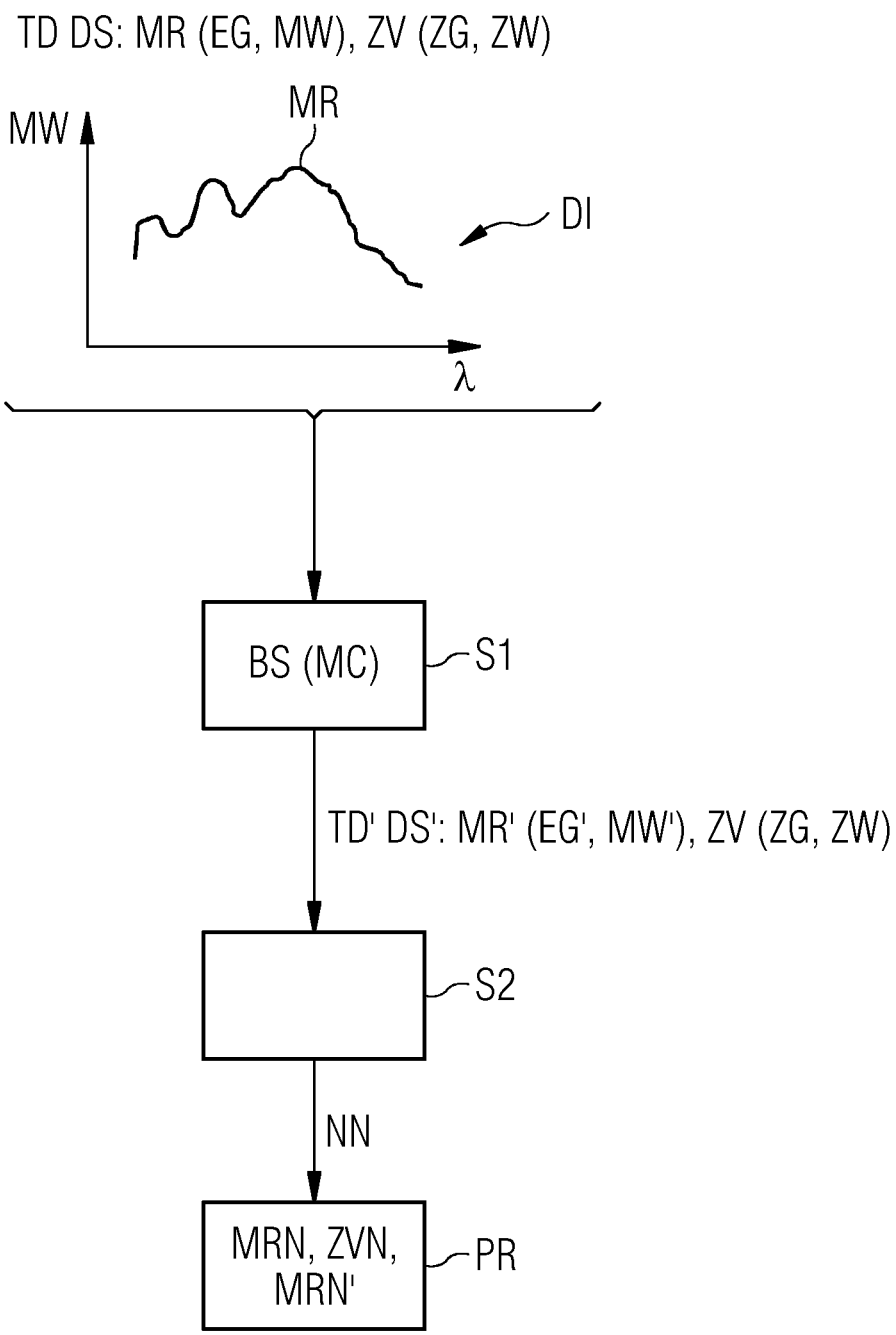

METHOD FOR THE COMPUTER-AIDED CONFIGURATION OF A DATA-DRIVEN MODEL ON THE BASIS OF TRAINING DATA

CROSS-REFERENCE TO RELATED APPLICATIONS

This application claims priority to PCT Application No. PCT/EP2018/065029, having a filing date of Jun. 7, 2018, which is based off of EP Application No. 17179817.6, having a filing date of Jul. 5, 2017, the entire contents both of which are hereby incorporated by reference.

FIELD OF TECHNOLOGY

The following relates to a method for the computer-aided configuration of a data-driven model on the basis of training data. Embodiments of the invention can be used in a multiplicity of technical fields of application. By way of example, embodiments of the invention can be used in the field of medical engineering to assist a doctor in classifying tissue types.

BACKGROUND

By way of example, spectroscopic methods are used in many areas of chemistry, food chemistry and biochemistry and also of biology and medicine for determining or classifying substances. The methods involve recorded optical spectra being interpreted as characteristic fingerprints of the (bio)chemical composition of the examined sample and used for classification. In order to be able to use spectral data of single samples for classification, prior knowledge of the typical properties of the classes to be distinguished is often necessary. As such, for example peaks in known spectral ranges are analyzed in order to ascertain the water and oxygen content and hence to isolate conspicuous test samples. If classes whose biochemical and hence spectral properties are not or only partly known are supposed to be distinguished, however, these methods cannot be used.

It is known practice from the prior art to learn data-driven models by means of measurement series, such as e.g. the spectra described above, as training data. For the optical spectra of the training data, the association thereof with applicable classes is known. The learned data-driven model can then be used to ascertain the classes with which an applicable optical spectrum is associated. Since training data records are frequently not available to a sufficient extent, the data-driven models can often be learned only inadequately, however, which means that sufficient prediction accuracy is not ensured by the learned data-driven models.

The document T. Yu et al., "Improving peak detection in high-resolution LC/MS metabolomics data using preexisting knowledge and machine learning approach", BIOINFORMATICS, vol. 30, No. 20, Jul. 7, 2014, pages 2941-2948, describes the detection of peaks in metabolomic data obtained by means of liquid chromatography and mass spectrometry. The data are subjected to machine learning in order to provide a model that can distinguish between actual peaks and noise. The method also involves binning of the metabolomic data being performed on the basis of local point density patterns.

The document S. Mahadevan, "DATA-BASED FAULT DETECTION AND DIAGNOSIS IN BIOLOGICAL AND PROCESS SYSTEMS", Doctoral thesis, Dec. 1, 2009, University of Alberta, Edmonton, Alberta, describes adaptive binning of metabolomic spectral NMR data. This binning is based on a cross-correlation analysis.

SUMMARY

An aspect relates to provide a method for the computer-aided configuration of a data-driven model on the basis of training data that results in a data-driven model with high prediction accuracy even when the volume of training data is small.

The method according to embodiments of the invention is used for the computer-aided configuration of a data-driven model on the basis of training data. The training data comprise a plurality of data records. A respective data record contains a measurement series, having a plurality of first input variables having associated first measured values, and a target vector, associated with the measurement series, comprising one or more target variables having associated target values. The first input variables are successive on the basis of a prescribed order. This prescribed order therefore reproduces a sequence of the input variables and of the measured values correlated therewith. By way of example, the prescribed order can be provided by physical parameters, such as energies or wavelengths, wherein the sequence corresponds to the direction toward larger or smaller values of the physical parameters. Similarly, the prescribed order may be represented by time, which is synonymous with a respective measurement series representing a time series of successive measured values.

In step a) of the method according to embodiments of the invention, the measurement series of the training data are each subjected to a preprocessing, as a result of which modified training data comprising modified data records are obtained. A respective modified data record comprises a preprocessed measurement series and the same target vector as the measurement series without preprocessing. A preprocessed measurement series comprises a plurality of second input variables having associated second measured values ascertained on the basis of the first measured values.

The preprocessing according to embodiments of the invention involves a binning step being performed in which first measured values of first and in particular adjacent first input variables of the respective measurement series are combined on the basis of one or more measurement characteristics to produce measured value sections having associated section values. The measured value characteristic(s) were available for the respective measurements from which the respective first measured values were obtained. In an exemplary variant, the binning step is performed directly in the space of the first measured values. Nevertheless, there is also the possibility of the binning step being applied to values that come from a conversion from the first measured values.

In accordance with the binning step of the method according to embodiments of the invention, the number of first (adjacent) input variables combined to produce measured value sections is stipulated. This number can vary across the measurement series. Furthermore, it may also be possible for the offset of the individual measured value sections to be stipulated in suitable fashion as part of the binning.

In an exemplary variant, the above-defined plurality of second input variables corresponds to the measured value sections, and the second measured values are the section values. Nevertheless, after the binning step, a further preprocessing step can be performed as part of the preprocessing. In this case, the second input variables and second measured values may be different variables than the measured value sections and section values.

The binning step can further also involve only portions of the first input variables being combined to produce measured value sections. In other words, after the binning step is performed, there may be occasional instances of first input variables also not being correlated with further first input variables. These occasional input variables are processed in the method according to embodiments of the invention as measured value sections with the corresponding first measured value as section value.

In a step b) of the method according to embodiments of the invention, the data-driven model is learned in computer-aided fashion on the basis of the modified training data, wherein the learned data-driven model allows the determination of target vectors on the basis of preprocessed measurement series.

The method according to embodiments of the invention is distinguished in that information concerning the capture of the measurement data is taken into consideration in suitable fashion in order to achieve physical-circumstances-based adaptation of the measurement series used as training data and thereby to increase the information content of the measurement data. This allows a good level of quality for the learned data-driven model to be ensured even when the number of training data records is limited.

In a particularly exemplary embodiment, the measurement characteristic(s) comprise(s) the noise in the respective measurements, wherein the binning step combines first measured values of first and in particular adjacent first input variables of the respective measurement series such that the average signal-to-noise ratio is maximized over the measured value sections, wherein, as a secondary condition of the maximization, allowances are made for a prescribed characteristic signal shape, e.g. in the form of peak widths in signal profiles, being preserved. Suitable optimization methods for performing this variant of embodiments of the invention are known per se and are therefore not described in detail. The embodiment just described ensures a high level of quality for the training data used for the learning of the data-driven model. The optimized data quality and the associated improved information content allow a good classification model to be obtained even when learning with few test or learning data.

Besides the binning step described above, the preprocessing in step a) of the method according to embodiments of the invention can also contain one or more further preprocessing steps still. In an exemplary embodiment, the preprocessing further comprises a rescaling and/or normalization of the first measured values or of values derived therefrom.

In a further, particularly exemplary embodiment, the section values of the measured value sections defined above are determined by means of an averaging over the first measured values of the respective measured value sections. In other words, the section values are a mean value of these first measured values. Depending on the configuration, it is possible for any desired mean value to be determined. In particular, the averaging can be a weighted or unweighted averaging. In an exemplary variant, the mean value determined is the arithmetic mean value. Similarly, however, the median can also be determined as the mean value or averaged over a Gaussian profile.

In a further variant of the method according to embodiments of the invention, the preprocessing in step a) for each measurement series involves the first derivative and/or the second derivative being determined according to an order parameter characterizing the prescribed order, wherein the first derivative and/or the second derivative are included as second measured values of second input variables in the preprocessed measurement series. In this manner, the information content in the measurement series is increased further, which allows the learning of the data-driven model to be improved. Depending on the configuration, the order parameter may be stipulated differently. In the case of an optical spectrum, the order parameter may be e.g. the wavelength or a variable derived therefrom, such as e.g. the energy. Further, the order parameter can be time if the measurement series is a time series.

In a particularly exemplary embodiment, the data-driven model used in the method according to embodiments of the invention is a neural network comprising an input layer, one or more hidden layers and an output layer, wherein the input layer obtains preprocessed measurement series as inputs and, on the basis of these inputs, generates outputs in the form of corresponding target vectors.

In an exemplary variant, the neural network used is what is known as a CNN (convolutional neural network) network. Such networks are known per se and contain as hidden layer at least one convolutional layer that uses a linear transformation to generate what is known as a feature map. There is also provision for at least one pooling layer, which reduces the dimension of the features of the feature map. In an exemplary configuration, the CNN network is a deep CNN network, which is also referred to as a DCNN (deep convolutional neural network) network and comprises a multiplicity of hidden layers.

Embodiments of the invention are not restricted to the use of neural networks as data-driven models, however. Rather, the data-driven model can also comprise a support vector machine and/or a cluster method (e.g. k-means clustering) and/or a decision tree and/or a PLS (partial least squares) regression. The PLS regression used in a specific variant is a PLSDA (partial least squares discriminant analysis) regression. All cited data-driven models are known from the prior art and are therefore not explained in detail.

In a further exemplary variant of the method according to embodiments of the invention, one or more target variables of the respective target vector each describe an association or nonassociation with a class. In this case, the data-driven model is used for classifying applicable measurement series. Nevertheless, a target variable can also be a variable having a multiplicity of continuous or discrete values.

In a particularly exemplary embodiment of the invention, the measurement series of the training data are optical spectra for respective objects, wherein an optical spectrum for a respective object comprises first measured values represented by an absorption or a transmission of electromagnetic radiation for the respective object on the basis of spectral values that are dependent on the wavelength of the electromagnetic radiation. The target vector specifies one or more features of the respective object as target variables. In one configuration, the spectral values directly represent the wavelength of the electromagnetic radiation. Nevertheless, the spectral values can e.g. also represent the energy of the radiation.

The embodiment just described can be used to analyze optical spectra of any desired materials in order to ascertain features of the materials in that way. In an exemplary variant, a respective object is a biological tissue sample of the human or animal body. The target vector in that case comprises a feature that specifies the biological tissue sample as pathological or nonpathological, e.g. as tumorous or nontumorous. Similarly, it is possible for a respective object to be an organic sample. The target vector comprises one or more features specifying the type of the organic sample and/or the aging state thereof.

In a particularly exemplary variant of embodiments of the invention, in which the measurement series are optical spectra, the measurement characteristic(s) taken into consideration in the binning step represent(s) the spectral resolution of the optical spectra on the basis of the spectral values. In that case, the number of first measured values combined as part of the binning step decreases monotonously as the spectral resolution increases. If the spectral values are wavelengths, the spectral resolution is normally greater toward higher wavelengths, with the number of combined first measured values decreasing toward higher wavelengths in this case.

An embodiment in which the measurement series are optical spectra has been described above. Nevertheless, embodiments of the invention are not restricted thereto and the measurement series can also be other organized measurement data. As already mentioned above, the measurement series can also be time series comprising first measured values obtained from measurements at different times.

Besides the above-described method for configuring a data-driven model, embodiments of the invention also relate to a method for the computer-aided determination of a target vector on the basis of a measurement series having a plurality of first input variables and associated first measured values, wherein the target vector comprises one or more target variables having target values to be determined and wherein the first input variables are successive on the basis of a prescribed order.

This method involves a learned data-driven model being provided that is learned using the method according to embodiments of the invention or one or more exemplary embodiments of the method according to embodiments of the invention. In this case, the measurement series under consideration is subjected to the same preprocessing as a respective measurement series of the training data in step a) of the method used to learn the data-driven model, as a result of which a preprocessed measurement series is obtained. The learned data-driven model is then used to determine the target vector on the basis of the preprocessed measurement series. The method therefore allows the prediction or ascertainment of target vectors for measurement series for which the target vectors are not known.

Besides the above-described methods according to embodiments of the invention, embodiments of the invention further relate to a computer program product (non-transitory computer readable storage medium having instructions, which when executed by a processor, perform actions) having a program code, stored on a machine-readable medium, for performing the method according to embodiments of the invention for the computer-aided configuration of a data-driven model or the method according to embodiments of the invention for the computer-aided determination of a target vector or for performing one or more exemplary variants of these methods.

Furthermore, embodiments of the invention relate to a computer program having a program code for performing the method according embodiments of to the invention for the computer-aided configuration of a data-driven model or the method according to embodiments of the invention for the computer-aided determination of a target vector or one or more exemplary variants of these methods.

BRIEF DESCRIPTION

Some of the embodiments will be described in detail, with reference to the following figures, wherein like designations denote like members, wherein:

FIG. 1 shows a schematic depiction of a neural network used as a data-driven model in a variant of the invention; and FIG. 2 shows a flowchart clearly showing the steps of an embodiment of the method according to the invention.

DETAILED DESCRIPTION

A variant of embodiments of the invention is described below on the basis of the computer-aided configuration of a data-driven model in the form of a neural network. A neural network NN of this kind is depicted schematically in FIG. 1. This network is a DCNN network, which has already been mentioned above.

The network NN comprises an input layer IL, multiple hidden layers HL1, HL2, . . . , HLn and an output layer OL. The neural network is used to ascertain or forecast a target vector comprising one or more features on the basis of a measurement series of measured values. This target vector is output via the output layer OL. In the embodiment described in the present case, measurement series relating to optical spectra of tissue samples are considered. This involves NIR (near infrared) spectra, with for example absorption spectra being considered. These spectra represent the absorption or the absorption coefficient of the tissue sample for light having different wavelengths. Following appropriate learning of the neural network NN, it is then possible to predict whether or not the tissue sample having the associated spectrum is part of a tumor.

In contrast to conventional methods, the measurement series are not supplied directly to the input layer IL of the neural network NN as input variables, but rather are subjected to a preprocessing beforehand in order to make suitable allowances for prior knowledge concerning the capture of the individual measured values. This preprocessing is also used when learning the neural network on the basis of applicable training data. The training data are data records comprising a multiplicity of measurement series in the form of the aforementioned optical spectra, it being known in advance whether or not the optical spectrum is associated with a tumorous tissue. In other words, a data record of the training data includes not only the optical spectrum but also a target vector that, in the example under consideration in the present case, is a classification of the tissue as tumorous or non-tumorous.

Nevertheless, the method according to embodiments of the invention is also usable for other types of target vectors, which can also comprise multiple features, a respective feature also being able to be represented by the applicable value of a variable. In this case, e.g. value ranges of a variable can characterize different states of materials for which the optical spectra have been recorded. For example they can be used to categorize the aging state of materials (such as e.g. oils).

FIG. 2 shows the learning of the neural network from FIG. 1. Training data TD comprising a multiplicity of data records DS are used for the learning. Each data record contains an experimentally determined measurement series MR comprising a multiplicity of input variables EG arranged in succession on the basis of a prescribed order. Each input variable is correlated with a measured value MW, the input variables of different data records DS being assigned different measured values MW. As mentioned, measurement series in the form of optical spectra of tissue samples are considered in the embodiment described in the present case, an applicable spectrum being indicated in the graph DI of FIG. 2.

The abscissa of the graph DI indicates the wavelength λ of the light shone onto the applicable tissue sample. The ordinate reproduces the measured values MW, which correspond to absorption coefficients for the different wavelengths in the example considered in the present case. This results in the measurement series MR in the form of the depicted curve. In the example under consideration, the order of the input variables is achieved by means of the different wavelengths λ. In other words, the wavelength λ is an order parameter to describe the order of the input variables.

Each spectrum of a data record DS of the training data TD is correlated with a target vector ZV, which, in the embodiment described in the present case, comprises a single target variable ZG to which an applicable target value ZW is assigned. This target value is the information concerning whether or not the tissue sample of the applicable data record DS is tumorous.

The training data just described are taken as a basis for performing the learning of the neural network NN. The training data are not used directly for this learning, however, but rather are subjected to a preprocessing, which is indicated by step S1 of FIG. 2. The preprocessing can comprise various substeps. What is essential to embodiments of the invention, however, is that it contains a binning step BS. This binning step involves measured values determined for adjacent wavelengths being combined by taking into consideration measurement characteristics MC relating to the measurement of the respective measured values. The combined measured values are measured value sections that each have an associated section value, which is the mean value of the combined measured values in the example under consideration in the present case.

In the embodiment described in the present case, one measurement characteristic taken into consideration is the noise in the respective measurement. In this case, the number of combined measured values is chosen such that the mean signal-to-noise ratio is maximized over the combined measured value sections and at the same time the signal shape still remains clearly identifiable over the resulting average. Appropriate methods of solving such an optimization problem are sufficiently well known to a person skilled in the art and are therefore not explained in detail. In the example under consideration, it is furthermore allowable for the number of measured values combined not to remain constant, but rather to be able to vary on the basis of the wavelength λ.

As an alternative or in addition to the cited maximization of the signal-to-noise ratio, the method of FIG. 2 can also involve taking into consideration the measured value characteristic of the spectral resolution of the measured values within the respective optical spectra. In this case, a benefit is derived from the inside that the resolution increases toward greater wavelengths, since there are lower energies there and e.g. the characteristic eigenmodes of the chemical groups of the material differ from one another in fingerprint style in the middle infrared. More distinct peaks in the spectrum are thus obtained at greater wavelengths. This measured value characteristic can now influence the preprocessing such that the number of measured values combined to produce measured value sections decreases toward higher wavelengths λ on account of the higher spectral resolution.

The preprocessing in accordance with step S1 of FIG. 2 can also comprise further steps in addition to the binning step BS. In particular, the measured values can be rescaled or normalized. For example, the measured values or the measured value sections resulting therefrom can be plotted not along a wavelength scale but rather along an energy scale, which is a nonlinear rescaling.

Furthermore, the preprocessing can also involve yet further measured values being added that come from the original measured values by virtue of mathematical calculations. In particular, e.g. the gradient (first derivative) or the curvature (second derivative) of the curve of the respective optical spectra can be considered as a further variable.

The result obtained from the preprocessing step S1 is finally modified training data TD' consisting of modified data records DS'. A respective modified data record DS' contains a measurement series MR', obtained in accordance with the above preprocessing, that is characterized by new input variables EG' in the form of measured value sections MW' with associated section values. Independently of this, the target vector ZV having the target variable ZG and the target value ZW for the modified data record DS' remains unchanged, i.e. the target vector is the same target vector as in the case of the unmodified data record DS.

On the basis of the training data TD', the neural network NN of FIG. 1 is finally learned. As input data, this network obtains the preprocessed measurement series MR' with the modified input variables EG'. The preprocessing has involved ensuring that the number of modified input variables EG' is the same for all data records DS'. The neural network is learned using methods known per se, and said learning is therefore not described in more detail. The result obtained is the learned neural network NN, which is subsequently used in the forecast step PR depicted in FIG. 2 to correctly determine the applicable target vector ZVN for a new measurement series MRN with an unknown target vector. The step PR involves the same preprocessing being performed as was applied to the training data when learning the neural network. In other words, the same binning is applied to a respective measurement series MRN to produce preprocessed measurement series MRN'. If need be, further preprocessing steps still are also performed, provided that they were also implemented for the training data. The result obtained for the step PR is finally a calculated target vector ZVN that, in the present case, indicates whether the optical spectrum is associated with a tissue sample that is tumorous. In a modified embodiment, it is also possible for a suitable multidimensional target vector to be used that further specifies what type of tissue, such as e.g. muscle, blood vessel, tendons, nerves, fat, etc., the tissue sample is associated with.

The embodiment of the invention that has been described above has a series of advantages. In particular, a method for learning a data-driven model is provided in which the measured data under consideration are preprocessed in suitable fashion by taking into consideration measurement characteristics, as a result of which it is possible for learning adapted to the physical circumstances of the measurement to be achieved. Specifically, the data quality before the actual learning process can be improved and this allows the prediction quality of the learned data-driven models to be increased. At the same time, the quality of the learning can be improved even when the number of training data records is small. This is very useful and advantageous particularly in the case of medical issues, since access to large volumes of data in training and validation phases is very complex or almost impossible.

The method according to embodiments of the invention can be used in a multiplicity of areas of application. As described above, e.g. optical spectra can be analyzed. Nevertheless, there is also the possibility of measurement series in the form of time series with successive measured values being processed.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for a computer-aided configuration of a data-driven model on a basis of training data, which comprise a plurality of data records, wherein a respective data record contains a measurement series, having a plurality of first input variables having associated first measured values, and a target vector, associated with the measurement series, comprising one or more target variables having associated target values, wherein the first input variables are successive on a basis of a prescribed order, wherein:
   a) the measurement series of the training data are each subjected to a preprocessing, as a result of which modified training data comprising modified data records are obtained, wherein a respective modified data record comprises a preprocessed measurement series and the same target vector as the measurement series without preprocessing, wherein the preprocessed measurement series has a plurality of second input variables having associated second measured values, which are ascertained on the basis of the first measured values, wherein the preprocessing contains a binning step in which first measured values of first input variables of the respective measurement series are combined on the basis of one or more measurement characteristics to produce measured value sections having associated section values, wherein the measurement characteristics were available for the respective measurements from which the respective first measured values were obtained;
   b) the data-driven model is learned in computer-aided fashion on the basis of the modified training data, wherein the learned data-driven model allows the determination of target vectors on the basis of preprocessed measurement series.

2. The method as claimed in claim 1, wherein the measurement characteristics comprise the noise in the respective measurements, wherein the binning step combines first measured values of first input variables of the respective measurement series such that the average signal-to-noise ratio is maximized over the measured value sections.

3. The method as claimed in claim 1, wherein the preprocessing in step a) comprises a rescaling and/or normalization of the first measured values or of values derived therefrom.

4. The method as claimed in claim 1, wherein the section values of the measured value sections are determined by means of an unweighted or weighted averaging over the first measured values of the respective measured value sections.

5. The method as claimed in claim 1, wherein the preprocessing in step a) for each measurement series involves the first derivative and/or the second derivative being determined according to an order parameter characterizing the prescribed order, wherein the first derivative and/or the second derivative are included as second measured values of second input variables in the preprocessed measurement series.

6. The method as claimed in claim 1, wherein the data-driven model comprises a neural network comprising an input layer, one or more hidden layers and an output layer, wherein the input layer obtains preprocessed measurement series as inputs and, on the basis of these inputs, generates outputs in the form of corresponding target vectors.

7. The method as claimed in claim 6, wherein the neural network comprises a convolutional neural network (CNN) network.

8. The method as claimed in claim 1, wherein the data-driven model comprises a support vector machine and/or a cluster method and/or a decision tree and/or a partial least squares (PLS) regression and/or a partial least squares discriminant analysis (PLSDA) regression.

9. The method as claimed in claim 1, wherein one or more target variables of the respective target vector each describe an association or nonassociation with a class.

10. The method as claimed in claim 1, wherein the measurement series of the training data are optical spectra for respective objects, wherein an optical spectrum for a respective object comprises first measured values represented by an absorption or a transmission of electromagnetic radiation for the respective object on the basis of spectral values that are dependent on the wavelength of the electromagnetic radiation, wherein the target vector specifies one or more features of the respective object as target variables.

11. The method as claimed in claim 10, wherein a respective object is a biological tissue sample, wherein the target vector comprises a feature that specifies the biological tissue sample as pathological or nonpathological, or wherein a respective object is an organic sample, wherein the target vector comprises one or more features specifying the type of the organic sample and/or the aging state thereof.

12. The method as claimed in claim 10, wherein the measurement characteristic comprise the spectral resolution of the optical spectra on the basis of the spectral values, wherein the number of first measured values combined as part of the binning step decreases monotonously as the spectral resolution increases.

13. The method as claimed in claim 1, wherein the measurement series of the training data are time series comprising first measured values obtained from measurements at different times.

14. A method for the computer-aided determination of a target vector on a basis of a measurement series having a plurality of first input variables having associated first measured values, wherein the target vector comprises one or more target variables having target values to be determined and wherein the first input variables are successive on a basis of a prescribed order, wherein:
   a learned data-driven model is provided that is learned using a method as claimed in claim 1;
   the measurement series is subjected to the same preprocessing as a respective measurement series of the training data in step a) of the method used to learn the data-driven model, as a result of which a preprocessed measurement series is obtained;
   the learned data-driven model is used to determine the target vector on the basis of the preprocessed measurement series.

15. A computer program product, comprising a computer readable hardware storage device having computer readable program code stored therein, said program code executable by a processor of a computer system to implement the method as claimed in claim 1 when the program code is executed.

* * * * *